D. ROESCH.
AUTOMATIC SPARK CONTROLLING DEVICE.
APPLICATION FILED JULY 17, 1915.

1,328,453.

Patented Jan. 20, 1920.

Witnesses
J. W. Angell

Inventor
Daniel Roesch
by Charles O. Tillie Atty.

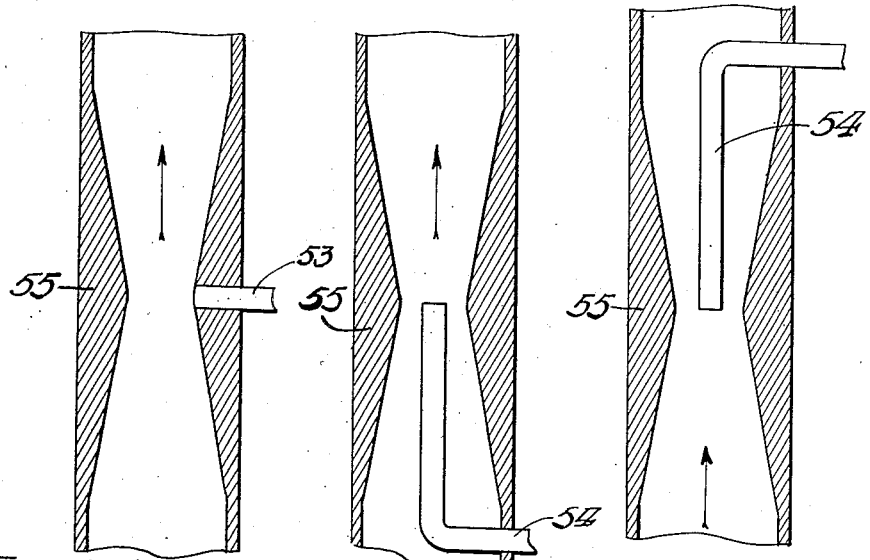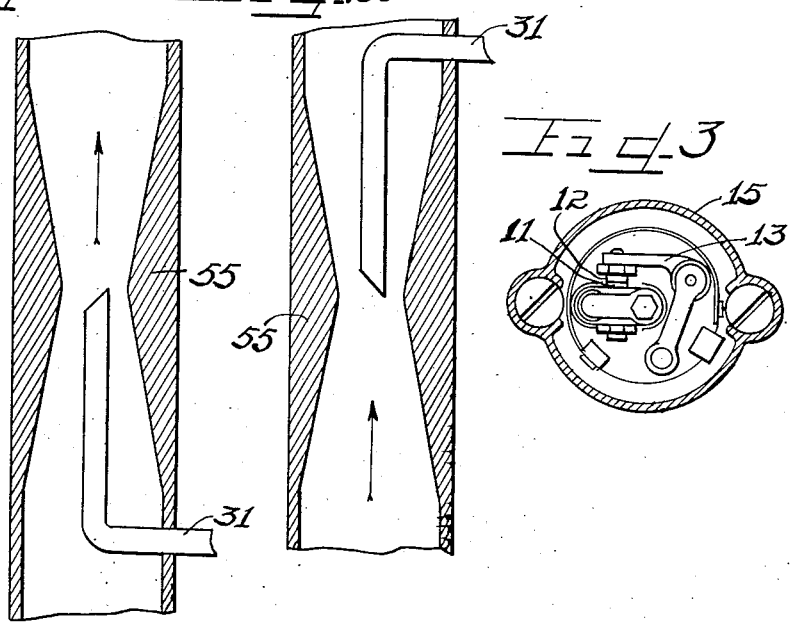

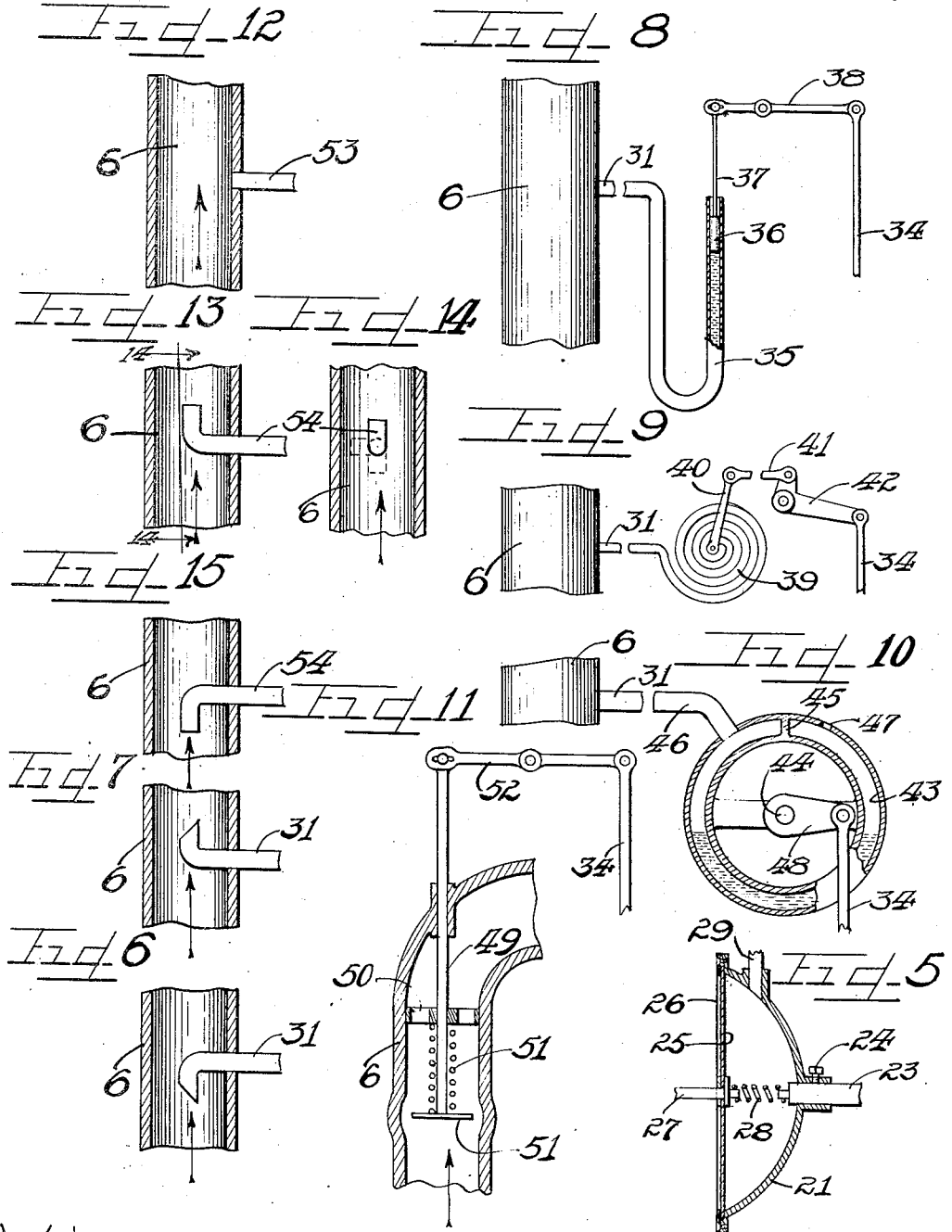

UNITED STATES PATENT OFFICE.

DANIEL ROESCH, OF CHICAGO, ILLINOIS.

AUTOMATIC SPARK-CONTROLLING DEVICE.

1,328,453.  Specification of Letters Patent.  Patented Jan. 20, 1920.

Application filed July 17, 1915. Serial No. 40,355.

*To all whom it may concern:*

Be it known that I, DANIEL ROESCH, a citizen of the United States, and a resident of the city of Chicago, in the county of Cook and State of Illinois, have invented certain new and useful Improvements in Automatic Spark-Controlling Devices; and I do hereby declare that the following is a full, clear, and exact description of the same, reference being had to the accompanying drawings, and to the numerals of reference marked thereon, which form a part of this specification.

The proper operation of a hydro-carbon or gasolene engine depends primarily upon the timing of the ignition means in order that greatest power may be secured with maximum economy in fuel consumption. The proper position of the spark or timing of the ignition for such an engine is a determinable quantity, variable through a wide range for different conditions, but by proper consideration thereof, the greatest power effect of the explosion or burning of the fuel in the cylinders of the engine, may be obtained. However, for variable speed engines, and for those wherein the power requirements are constantly changing, the timing of the ignition becomes a variable dependent upon more than one factor, of which may be mentioned, first, the rate of speed of the engine, and secondly, the rate of flame propagation through the burning mixture. The latter consideration, of course, is effected to a large extent by the particular design of the engine, which may produce high or low compressions, as the case may be, and is also dependent upon power requirements, which serve to change the quantity of mixture required, thus influencing the compression, and as well varying proportionate quantities of the elements constituting the fuel mixture.

Engineers have long recognized the necessity of wide variations in the ignition timing of variable speed engines wherein power requirements are not constant, such as engines used in motor cars, but have been at loss to provide suitable means for automatically adjusting the ignition timing means. As a consequence, the adjustment is left to the operator, and a spark or ignition timing lever is generally mounted conveniently upon the steering wheel of the motor car, and such lever, by adjustment, may serve to retard or advance the spark, giving later or earlier ignition with respect to the position of the pistons within the cylinders of the car, as the case may be. Even in the hands of a most skilful operator, however, delicate adjustments for proper timing of the ignition are impossible. Thus, due to the fact that few operators of motor cars attempt in any manner to make constant adjustments of the spark for different conditions experienced, poor economy in fuel consumption is one result, and either knocking, due to pre-ignition, or overheating of the engine, due to late ignition, and many disastrous results traceable thereto, come into existence.

In order to remedy this condition to some extent, centrifugal governors have been designed, which serve to advance and retard the spark, according to fluctuations in the speed of the engine, but this is theoretically, as well as practically, incorrect, due to the fact that such variation is only theoretically correct for a given horse power developed by the engine, and the ignition, in its relation to the fluctuations in the power requirements on the engine, is not correctly taken care of. The timing of the ignition varies not only with the speed of the engine for a given power developed, but also for variations in power for a given speed of the engine, and the results in securing proper adjustment of the timing, may be cumulative or differential, according to conditions.

When the speed of the engine is increased, the time allowed for combustion of the mixture to take place within the cylinders is lessened, and as a consequence the spark must occur earlier than at slower speeds, in order that complete combustion may be effected at the proper point in the cycle of operation of the engine. Similarly, when the engine is operated at low speeds, the spark must be retarded, or in other words ignition caused to take place later than at high speeds, due to the fact that the rate of movement of the pistons in the cylinders with reference to the rate of flame propagation is less, so that again complete combustion of the mixture in the cylinders is insured at the proper point in the cycle of operation.

Assuming the engine to be running at a constant speed, as for instance in the case of a motor car traveling over a boulevard at an average rate of speed of fifteen miles an hour, and the engine thus operating under light load, and then assume the car suddenly passing onto a stretch of sandy road, and still maintaining the same speed of fifteen miles per hour, the power requirements imposed upon the engine will be greatly increased, and yet the speed of the engine will not have changed. As a consequence, where the ignition timing is under the control of a centrifugal governor dependent only upon the speed of the engine, the position of the spark for that on the smooth boulevard road will not have been changed for the heavy pulling on the sandy road. This condition is manifestly improper for correct operation of the engine, for the reason that with increased power requirements the quantity of fuel mixture introduced into the engine for combustion, is greatly increased, thus increasing the compression and consequently the rate of flame propagation through the mixture. This necessitates a retardation of the spark for increased power requirements in order to secure ignition at the proper point in the cycle of operation of the engine.

I have found by experiment that the conditions manifest within the intake manifold of a hydro-carbon engine are directly indicative of the power developed by the engine, and that the general phenomenon is practically the same for all engines, although the exact characteristics of this phenomenon may differ slightly for different types of engines. However, the difference in the characteristic may be readily corrected by the mechanical linkage or mechanisms which are susceptible to the conditions manifest within the manifold, thus insuring proper timing of the spark according to power requirements imposed upon the engine. The conditions to which I refer as manifest within the intake manifold of the engine and varying according to different power requirements, are conditions of pressure and velocity of flow of the fluid therethrough.

By experiment I have found that for light load requirements the pressure within the manifold falls considerably below atmospheric, amounting to a considerable suction, and with increasing power requirements or heavy loads that the pressure rises, approaching that of atmospheric or a condition of low suction. I have also found that the velocity of flow of mixture through the intake manifold is comparatively low for low power requirements, and increases proportionately with increased power requirements. I therefore propose to utilize the effect of pressure and flow within the intake manifold of a hydro-carbon engine for operating suitable mechanisms which control timing of the ignition to fire or ignite the mixture within the engine at the proper point in the cycle, according to power requirements. I attain these objects by introducing into the intake manifold of the engine a tube, the design of which may be different for different engines, to utilize the conditions of pressure and flow existent in the manifold, whereby the effect of either or both the dynamic and aspiration head, due to the flow of the mixture, may be gained, and preferably, though not necessarily, so combined with the static or suction effect as to cause the variation in power requirements on the engine to be exhibited according to well defined characteristics having a definite relation to one another. Knowing the characteristic, accurate calculation can be easily made for the construction of apparatus to actuate the ignition means for theoretically proper operation of the engine.

It is an object therefore of this invention to construct a combination of co-acting devices for automatically controlling the timing of the ignition of a hydro-carbon engine to insure proper ignition of the mixture for all possible conditions in variation of speed and power requirements to obtain a cumulative effect to either advance or retard the spark, or to secure a differential effect for adjustment of the spark if conditions of speed and power requirements so require.

It is also an object of this invention to utilize in combination with a centrifugal controlling mechanism for timing the ignition of a hydro-carbon engine, according to rate of speed thereof, a device which serves to advance or retard the ignition according to power requirements, dependent upon conditions existent within the intake manifold of the engine.

It is also an object of this invention to construct an ignition timing mechanism dependent for its operation upon conditions of flow and pressure within the intake manifold of an engine, acting thereby to cause fluctuations of a diaphragm forming one wall of a sealed chamber in communication with the intake manifold, whereby the diaphragm serves to operate mechanism for changing or varying the timing of ignition.

It is also an object of this invention to provide ignition timing mechanism for a hydro-carbon engine operated by a combination of devices, the one acting to vary the ignition according to different speeds of the engine, and the other acting independently thereof and yet coöperatively therewith, according to power requirements on the engine, whereby the effect of said different mechanisms may be comulative or differential, according to the conditions imposed upon the engine to obtain correct timing of the ignition.

It is also an object of this invention to construct a device for controlling the timing of the ignition of a gasolene engine dependent for its operation upon the quantity of fuel mixture admitted to the cylinders of the engine.

It is also an object of this invention to construct a controlling means for timing the ignition of a gasolene engine according to the flow of mixture to the cylinders of the engine.

It is also an object of this invention to utilize in combination with a centrifugally controlled spark controlling mechanism, spark controlling means operating to vary the timing of the spark according to power requirements, taking into account both conditions of pressure and flow of the fuel mixture to the cylinders of the engine.

It is also an object of this invention to construct a spark controlling mechanism dependent for its operation upon the dynamic effect of flow of fuel mixture to the cylinders of a hydro-carbon engine.

It is also an object of this invention to construct spark controlling mechanism for a gasolene engine dependent for its operation upon the aspiration effect due to flow of mixture to the cylinders of the engine.

It is furthermore an object of this invention to construct a mechanism for operating a spark controlling means of an engine which is susceptible to conditions manifest within the intake manifold of the engine and dependent thereon for its operation, embracing means communicating into the manifold so constructed and so adjustable as to take into account the effect both of pressure and flow to insure adjustment of the spark controlling means characteristically according to power requirements of the engine.

It is finally an object of this invention to construct ignition controlling mechanisms dependent for operation upon speed and power requirements of the engine, the mechanisms operating to cause ignition of the charge within the cylinders of the engine at the proper point in the cycle of operation thereof at all speeds and power requirements.

The invention (in a preferred form) is illustrated in the drawings and hereinafter more fully described.

In the drawings:

Fig. 3 is a detail view of the breaker mechanism at the end of the magnets.

Fig. 5 is a detail section taken on line 5—5 of Fig. 4, with parts omitted.

Fig. 6 is a fragmentary interior view of the intake manifold illustrating an adjustable tube forming a part of my device communicating therein.

Fig. 7 is a similar view illustrating the tube directed upwardly.

Fig. 8 is a fragmentary view of a modified form of apparatus for utilizing the effect manifest within the manifold.

Fig. 9 is a fragmentary view illustrating another form of device for utilizing the effect set up within the manifold.

Fig. 10 is a fragmentary view of a modified form of apparatus for utilizing the effect within the manifold in another manner.

Fig. 11 is a fragmentary view of another modified form of device for connection in the manifold of the engine to utilize the effect of conditions existent therein.

Fig. 12 is a view similar to Fig. 6, illustrating another type of tube communicating into the manifold.

Fig. 13 is a view similar to Fig. 6, illustrating another type of tube directed with the flow.

Fig. 14 is a sectional view taken on line 14—14 of Fig. 13, illustrating the possibility of adjustment of the tube in dotted lines.

Fig. 15 is a view similar to Fig. 13, illustrating the tube directed against the flow in the manifold.

Fig. 16 is a sectional interior view of a venturi type of manifold with a tube communicating therein at the throat of the venturi.

Fig. 17 is a similar view illustrating another type of tube directed with the flow.

Fig. 18 is a view illustrating the same type of tube directed against the flow.

Fig. 19 is a view similar to Fig. 17, illustrating the use of another type of tube directed with the flow.

Fig. 20 is a similar view illustrating the latter type of tube directed toward or against the flow.

As shown in the drawings:

Figure 2:
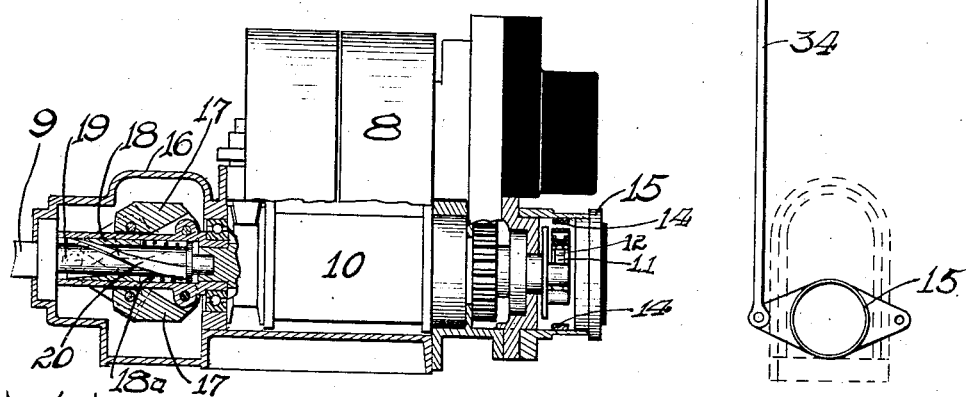
Fig. 2 is an enlarged side elevation partly broken away and shown in section, of a magneto equipped with a plurality of means for changing the timing of the ignition within the cylinders of the engine.

The reference numeral 1, indicates as a whole a four cylinder engine having cylinders 2, 3, 4, and 5, and provided with a Y-shaped intake manifold 6, with a carbureter 7, attached thereto. Mounted conveniently at one side of the engine, is a magneto or other ignition device 8, suitably driven by a shaft 9, which may be geared or otherwise suitably connected to be driven by the crankshaft of the engine. However, the details of drive are not shown, for the reason that this type of construction is well known in the art. The ignition device 8, as clearly shown in Figs. 2 and 3, is provided with a breaker or interrupter mechanism by the shifting of which change in timing of the ignition of the engine is achieved, that is, the break is caused to take place at any one of a wide range of points with reference to the position of the pistons in the cylinders of the engine.

The armature of the magneto is indicated as a whole by the reference numeral 10, and secured upon one end of the armature shaft is the breaker mechanism which constitutes a pair of contact points 11 and 12, the contact point 11, being fixed with reference to the armature shaft, and the contact point 12, being mounted upon the end of a pivoted lever 13, all of which, however, rotate together with the armature shaft. Said lever 13, is of course spring impelled to normally maintain the contacts 11 and 12, closed, and is caused to open to break the circuit whenever the tail of said lever travels over an abutment 14, within the movable breaker housing 15, the latter which, due to its possibility of pivotal movement, may change the timing or occurrence of the break in the circuit, causing generation of the spark. It is obvious that the timing of the spark may also be changed by shifting the angular position of the armature shaft, for the reason that the breaker mechanism moves therewith. For this purpose, inclosed within a housing 16, at one end of the magneto, is a centrifugal or automatic controlling mechanism consisting of a pair of weights 17 attached at one end to a sleeve 18, through which runs the shaft 19, of the magneto, which is coupled in any suitable manner directly to the drive shaft 9, and said weights are hinged at their other ends to the armature.

Along the shaft 19, are two helicoidal ridges 20, which engage with similarly shaped splines in the sleeve, and consequently when the armature is rotated the weights begin to spread and exert a longitudinal pull on the sleeve against the stress of a spring 18ª, thus slightly rotating the sleeve on the shaft 19, so that due to the fact that the weights are connected to the sleeve and armature, the armature is also rotated and the position of the armature with reference to its drive shaft 19, is changed. In this way, the moment of greatest induction is advanced or retarded, and with it the break in the primary circuit, due to the angular shift of the armature with reference to the housing 15, and its abutments 14, which lifts the lever 13, and causes the break in the primary circuit. The spreading of the weights rotates the armature forward and advances the spark, and the resumption, either total or in part, by the weights of their original position close to the shaft, retards the spark by rotating the armature backward. Inasmuch as the change in timing is accomplished by changing the relative position of armature and the drive shaft 19, thereof, or by shifting the breaker housing 15, in which the abutments for the breaker mechanism are located, it is obvious that a double adjustment of the timing means may be effected, which may be cumulative or differential, that is, if cumulative, to secure a maximum advance or retardation of the spark, or if differential, to cause the adjustment by centrifugal mechanism to be negatived by the adjustment of the housing 15, or vice versa.

Figure 1:
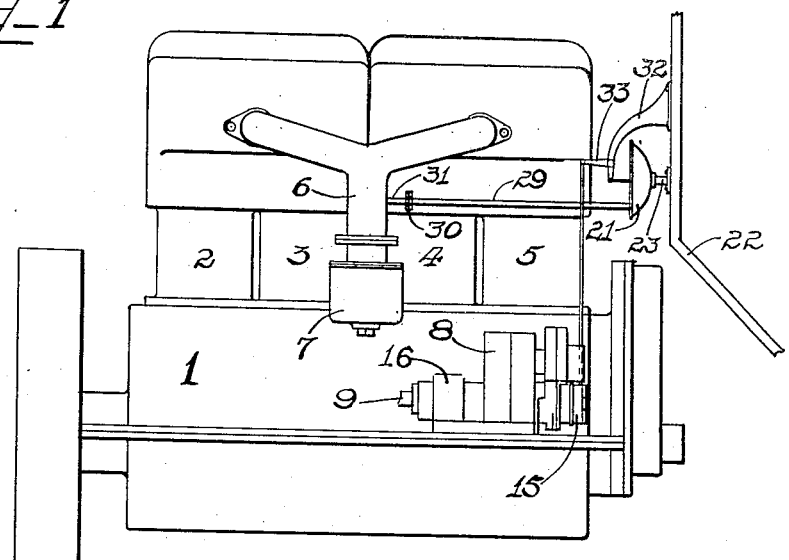
Figure 1 is a side elevation of a four cylinder engine illustrating a manner of association therewith of ignition mechanisms and means for varying the timing of the ignition for different speeds and power requirements.

My invention also embodies a mechanism for shifting the breaker housing 15, according to power requirements imposed upon the engine, irrespective of variations in speed thereof or any tendency to a change in the timing of the ignition by the centrifugal means which is, of course, susceptible to changes in speed of the engine. This mechanism consists of a bell shaped casing 21, mounted in any convenient position but, as shown, secured to the dash 22, of a motor car, in which the engine 1, is mounted. As shown in the detail view in Fig. 5, an axial aperture is provided in said bell shaped casing through which a stem 23, of an attaching bracket secured to the dash 22, extends adjustably and in sealing relation, though of course auxiliary sealing means, not shown, of any suitable type may be utilized if so desired. A set screw 24, is threaded through the boss formed on said casing to engage the stem 23, and hold the same secure. Secured across the open end of the bell casing 21, in sealing relation therewith is a flexible diaphragm 25, made of any suitable material for the purpose and held attached in position by a ring 26, bolted or screwed to the casing 21. Of course, if desired a plate may be used to cover the exposed surface of the diaphragm and also hold the same attached. Secured through said diaphragm and reinforced on each side thereof, is a stem 27, which, at its end on the inner side of the diaphragm, is reduced in diameter to receive engaged thereover a coiled spring 28, the other end of which seats upon the reduced end of the stem 23, thus resisting inward movement of the diaphragm and said stem 26. It is obvious, however, that more than one coiled spring may be used whereby the second spring may come into action subsequently to the first if conditions are such making this arrangement desirable. The adjustability of the stem 23, with reference to the bell casing 21, is to permit any desired initial stress to be imposed upon said spring 28. Communicating through an apertured boss provided on one side of said bell casing 21, is a pipe 29, which, as clearly shown in Fig. 1, leads to the intake manifold 6, of the engine and is there connected by means of a suitable coupling 30, to a tube 31, which communicates sealingly through said intake manifold, and is adjustable therein, that is to say, the tube may be rotated or moved inwardly and outwardly in the manifold, as desired. The point at which the tube 31, communicates into the manifold, regardless of the design of the manifold, is between the throttle and the intake to the engine cylinders.

Due to the conditions within the manifold 6, that is, conditions of pressure and flow which, by experiment, have been found to vary characteristically according to power developed by the engine, the effect thereof may be transmitted by means of the tube 31, and pipe 29, to the bell casing 21, thus causing a movement of the diaphragm 25 and stem 27, therewith. In order to utilize the effect within the manifold 6, the tube 31, as shown in detail in Fig. 9, is at its end curved downwardly and beveled off, so that the opening thereof permits the construction to take into account conditions of pressure, to-wit static conditions, which vary within certain limits below atmospheric pressure when the engine is running, as well as conditions of flow, to-wit dynamic conditions, which are dependent upon the velocity of flow and vary inversely to the static conditions. That is to say, when the engine is operating under light load with the throttle valve in the carbureter only slightly open, considerable suction is manifest within the intake manifold 6, which serves to withdraw the air or other fluid contents of the bell chamber 21, causing the diaphragm 25, to be drawn inwardly against the compression of the spring 28, and moving the stem 27, therewith. As the power requirements of the engine increase and the throttle of the carbureter is opened wider the suction manifested within the manifold being more or less satisfied by the increased opening of the throttle valve, decreases, so that the position of adjustment of the diaphragm 25, and stem 27, for greater power requirements, is not as extreme as that for low power requirements.

However, it is evident that a certain range of movement of the diaphragm takes place between low power and high power requirements of the engine, due to the suction effect manifested within the manifold. Another effect already mentioned, and exhibiting itself in an inverse relation to that of the suction, is the dynamic or velocity head of the flow through the manifold. Due to the fact that the end of the tube 31, within the manifold, is directed against the flow, as shown in Fig. 9, the dynamic effect of flow is utilized. For light load requirements the velocity of flow is relatively small, but with increasing power requirements of the engine and an increasing throttle opening a greater quantity of mixture is passed through the manifold at an increased velocity, so that the dynamic head is increased. Thus it is apparent that the velocity head of flow within the manifold exists as a direct proportion to the power requirements, the velocity head being low for low power requirements and high for high power requirements, and the effect of the dynamic or velocity head of flow is transmitted to the bell casing 1, and diaphragm 25. Inasmuch as the dynamic head is a condition of pressure and exhibits itself inversely with respect to the suction, it is obvious, due to the fact that the two are opposite, they are also cumulative. That is to say, for low power requirements resulting in high suction in the manifold, the dynamic head is relatively low and does not tend to noticeably decrease the suction effect in the bell casing, whereas with high power requirements the suction decreases and the dynamic head increases. Consequently, the dynamic head exerts a cumulative effect on the decreasing suction to further decrease the effect thereof in the bell casing, so that a great range of suction effect is secured by utilizing the combination of both dynamic and static effect. The great range of effect thus obtained, of course tends to increase the sensitiveness of operation of the device. In order to utilize the movement of the stem 27, a bracket 32, is secured upon the dash 22, and extends downwardly into a convenient position to pivotally support a bell crank 33, one crank of which is pivotally connected to the ends of the stem 27, the flexibility of the diaphragm 25, permitting a simple connection to be made. The other arm of said bell crank is pivotally connected by means of a pin and slot connection to a long link 34, the lower end of which is pivoted to an extension on the adjustable breaker housing 15.

In Fig. 7 I have shown the tube 31, directed upwardly or with the direction of flow within the manifold 6, so as to utilize not only the static suction effect, but also the aspiration effect due to the flow within the manifold. This may be desirable in some instances for the reason that differently designed engines exhibit different characteristics, and it may be desirable to so adjust the tube communicating through the manifold by rotating the same to an intermediate position from the extreme position shown in Fig. 6, to that shown in Fig. 7, to secure a correct position whereby the effect manifested within the manifold and transmitted to the bell casing will be most nearly a simple proportionate characteristic with reference to power requirements.

I have shown a modification of my invention in Fig. 8, wherein in place of the bell casing 21, and diaphragm 25, I have utilized a U-tube 35, suitably connected to the interior manifold 6, by the tube 31, and containing a liquid which of course changes its level in the tube with changes in conditions arising within the manifold 6. Mounted in the upper end of one branch of said U-tube 35, is a float 36, provided with a stem 37, which is connected to a bell crank 38, pivoted in any suitable position on the engine and connected to the actuating link 34, of the ignition means.

I have illustrated another modification in Fig. 9, wherein I utilize a Bourdon tube 39, which is susceptible to changing conditions within the manifold 6, by connection with the tube 31, mounted therein. The Bourdon tube operates in a familiar manner to actuate an arm 40, which is connected to a link 41, which is in turn connected to a bell crank 42, and to which the actuating link 34, connected to the magneto, is connected.

Fig. 10 is a view of another modification wherein a hollow ring 43, known as a torus is pivotally mounted upon a fixed shaft 44, and is provided in its interior with a partition 45, thus dividing the interior of the ring into two compartments, the other dividing element on the interior of the ring being formed by a quantity of a sealing liquid. One compartment within the ring is connected by means of a flexible tube 46, with the tube 31, in the intake manifold of the engine, and the other compartment within the ring is under atmospheric pressure, a small aperture 47, being provided in the wall of said compartment and open to the air for the purpose. Rigidly connected to said ring 43, is a crank 48, which in turn is connected to the upper end of the actuating link 34, of the magneto timing mechanism. The effect within the manifold 6, is manifested with the left hand compartment of the ring shown in Fig. 10, so that a suction will cause a rise in the level of the fluid on the left side of the ring, and a lowering thereof on the right side of the ring, thus displacing the center of gravity of the ring and causing the same to rotate and the crank 48, therewith to actuate the link 34.

Fig. 11 illustrates a form of device for utilizing the dynamic effect of the flow within the manifold 6, and for this purpose a stem 49, is mounted vertically within the manifold, extending preferably through a sealing means in the wall thereof, though not necessarily so, said stem also extending through a spider 50, mounted on the interior of the manifold, to guide the stem in its movement. On the lower end of the stem is secured a disk 51, and as clearly shown, the walls of the manifold are deformed to afford an enlargement therewithin around said disk to facilitate passage of the fluid deflected therearound. Coiled around the stem 49, and disposed between the spider 50, and the disk 51, is a compression spring 52, which serves to resist upward movement of the disk and stem resulting from the impact of the moving fluid within the manifold on the disk. The upper end of the stem 49, is attached by means of a suitable pin and slot connection with a bell crank 52, which in turn is connected with the actuating link 34, of the magneto timing mechanism.

In the modified form of device shown in Fig. 12, I have shown a simple tube 53, communicating through the walls of the manifold 6, with the plane of the open end of the tube parallel to the flow so as to be affected only by static conditions.

In Figs. 13, 14, and 15 I have illustrated the use of a tube 54, which is curved at a right angle at its end and is adjustable within the manifold, so that an aspiration effect may be gained with the tube in the adjustment shown in Fig. 13, and a dynamic effect with the tube shown in the adjustment in Fig. 15, Fig. 14 showing in dotted lines possible positions of adjustment of said tube.

As shown in the modified forms of device in Figs. 16 to 20 inclusive, the various forms of tubes 31, 53, and 54, in their different positions of adjustment are shown connected into a manifold 55, the interior of which is shaped to afford a Venturi tube, so that the effect manifest therein at the throat of the tube may be transmitted to suitable actuating apparatus for adjustment of the timing mechanism of the ignition means.

The operation is as follows:

As pointed out, my experiments have shown that certain definite relations exist between the conditions manifested within the intake manifold of a gasolene engine and the power requirements imposed thereon, and the bell shaped casing and diaphragm 25, being suitably connected into the manifold by means of a tube, the diaphragm is susceptible to changes of conditions within the manifold, and by its movement serves to adjust the timing mechanism of the ignition device of the engine. This insures correct timing of the spark within the cylinders for different power requirements, that is to say at low power requirements the suction within the intake manifold being high, and the velocity of flow therethrough being low, a tube capable of taking into account these effects and transmitting the same to the diaphragm 25, causes the same to be drawn into its bell shaped casing, and thus holding the spark timing means which consists in part of the adjustable casing 15, at an advanced spark position. However, upon the power requirements upon the engine being increased, thus causing a greater quantity of fuel to be used, as well as greater compression in the cylinders and necessitating a retarded spark, due to the greater rate of flame propagation, it is necessary to adjust the housing 15, to secure a retarded spark. This is readily effected by the diaphragm, due to the fact that under heavy load or increased power requirements, conditions manifested within the intake manifold of the engine are such as to decrease the suction therein and increase the velocity or dynamic head of flow of the mixture which, having a cumulative relation with the suction effect, decreases the condition of suction within the bell shaped chamber, or in other words increases the pressure therein so that the diaphragm is impelled outwardly under the impulse of its spring 28.

Of course the centrifugally operating governor also mounted on the ignition device, serves to adjust the armature and that portion of the timing or breaking mechanism therewith to different positions for different speeds of the engine, so that at low speeds a retarded spark is obtained, and with increasing speeds the spark is advanced. It is obvious that the respective controlling mechanisms which actuate the timing mechanisms of the ignition device may operate cumulatively or differentially, according to conditions imposed upon the engine. That is to say, the engine may increase in speed and the centrifugal operating mechanism acts to advance the spark, whereas for increasing power requirements the diaphragm device serves to retard the spark, so that proper timing of the spark is secured for all conditions.

Figure 4:
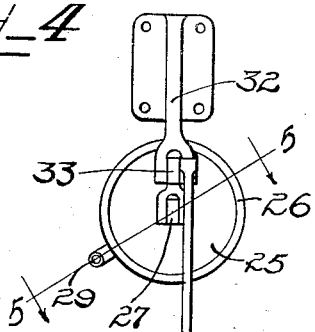
Fig. 4 is a fragmentary end view of the controlling mechanisms shown detached from the engine.

The normal position of that part of the spark controlling mechanism operated by the diaphragm such as shown in Fig. 4, is advanced, whereas that part operated by the centrifugal means is retarded. However, the moment an attempt to start the engine is made, the diaphragm acts to move the portion of the timing means under its control to full retard position. Of course, any suitable connections of actuating levers may be provided to secure manual control of the spark together with the automatic means if so desired.

The various modified forms of devices illustrated in the figures all operate upon the same principle, that is in taking into account the conditions within the manifold of the engine. However, the modification illustrated in Fig. 11, depends for its operation only upon dynamic conditions within the manifold, and not static conditions. It is obvious that differently designed engines exhibit different characteristics as to the effects manifested within the intake manifold, and I purpose ascertaining and employing the most satisfactory characteristics by the use of different types of tubes inserted into the manifold to take account of either suction, dynamic, or aspiration heads, or any combination thereof for the purpose.

I am aware that various details of construction may be varied through a wide range without departing from the principles of this invention, and I therefore do not purpose limiting the patent granted otherwise than necessitated by the prior art.

I claim as my invention:

1. In a device of the class described, the combination with an engine and means for automatically timing the ignition of said engine according to changes in speed, of mechanisms connected to time the ignition of the engine independently or coincident with said means, comprising a fluid pressure operated element, communication means between said element and the manifold of said engine, and an adjustable device projecting into the interior of said manifold and adjustable into different positions therein to utilize the different effects of pressure and flow therein, said device connected and communicating with said last mentioned means.

2. In a device of the class described, the combination with centrifugally operated mechanism for a gasolene engine, of means co-acting therewith to effect proper adjustment of the ignition timing mechanism according to power requirements on the engine, said means comprising a fluid pressure operated device, means projecting into the interior of the manifold of the engine and shaped to utilize the effects of the pressure and flow therein, and a communicating connection between said device and said means whereby the effects imposed on said means in the manifold are transmitted to said device.

3. In a device of the class described, the combination with an engine and its ignition timing mechanism, of means to adjust said mechanism automatically and means communicating with said first mentioned means and projecting into the interior of the intake manifold of the engine and having adjustable relation therewith to assume different positions therein to utilize different effects of pressure and flow within said manifold for actuation of said first mentioned means.

4. In a device of the class described the combination with an ignition timing mechanism of an engine consisting of a tube mounted to project into the interior of the engine intake manifold and adjustable to assume different positions therein directed against, with, or transversely to the flow through said manifold to utilize different effects therein, and mechanisms connected thereto and operated thereby according to the effects realized to actuate the ignition timing mechanism.

5. A device of the class described comprising in combination with an engine and its ignition timing mechanism, a fluid tight flexible diaphragm, means to resist movement of said diaphragm and adjustable to change the resistive effect thereof, a piping connection between said diaphragm and the intake manifold of the engine, and a tube forming a part thereof connected into said manifold and projecting into the interior thereof beyond the inner walls of said manifold.

6. In a device of the class described the combination with an engine and its fluid intake means, of centrifugally controlled spark timing mechanism, a pressure operated device for co-action therewith in effecting adjustment of the spark timing mechanism comprising a casing, a flexible diaphragm secured therein, a spring to resist movement of said diaphragm, means adjusting the resistive effect thereof, and a tube mounted to project into the interior of the intake means beyond the inner walls thereof and communicating with said pressure operated device to transmit the effects realized in said intake means to said diaphragm for operation of the spark timing mechanism.

7. A device for attachment to an engine for effecting adjustment of the spark timing mechanism of said engine comprising a casing, a flexible diaphragm secured thereon and affording one wall thereof, means to resist inward movement of the diaphragm, and communicating means between said casing and the intake manifold of the engine, said means comprising in part, a tube extending into the interior of said manifold and adjustable therein, whereby effects manifested within the manifold of the engine are transmitted to said diaphragm for proper operation of the spark timing mechanism.

8. A device for automatically operating the spark timing mechanism of an engine comprising means susceptible to conditions occurring within the intake manifold of the engine and operatively connected with the said spark timing mechanism, an adjustable tube in connection with said means and disposed in the interior of said manifold away from the walls thereof and adjustable to different positions therein, said tube having an inclined mouth for utilization of various static and flow effects manifested within the manifold.

9. In a device of the class described, the combination with an engine and its ignition means, of mechanisms for timing the ignition means, said mechanisms connected with the intake manifold of the engine to operate by utilizing static and dynamic changes therein.

10. The combination with an engine and its ignition means, of mechanisms connected with the intake manifold of the engine to utilize the dynamic and aspiration effect of flow therein to vary the timing of said ignition means.

11. The combination with an engine and its ignition means and an intake manifold for the engine, of mechanisms for varying the timing of said ignition means by utilizing the different conditions of velocity of flow within the intake manifold.

12. In a device of the class described, for timing the ignition on a gasolene engine, means for operating the timing mechanism, and connection between said means and the intake manifold of the engine to cause operation of said means according to conditions of flow within the manifold.

13. In a device of the class described, the combination with an engine, its ignition mechanism and fluid intake means of a speed controlled device for varying the timing of said ignition mechanism according to different speeds of the engine, and means susceptible to conditions within the intake means connected to the ignition mechanism and coacting with said speed controlled device to secure proper adjustment of the ignition mechanism, said second mentioned means comprising in part, a tube projecting into the interior of said intake means and adjustable therein to various positions to utilize static, aspiration and dynamic effects therein.

14. In a device of the class described, the combination with an engine, its intake manifold, and an auxiliary mechanism, of adjustable means connected through and projecting into the manifold of the engine and susceptible to changes therein and connected to said mechanism to cause actuation of said mechanism.

15. In a device of the class described, the combination with an engine and a fuel inlet therefor and the means controlling the flow through said inlet, of mechanisms communicating with the interior of said inlet and caused to operate by changes in conditions of pressure and flow therein.

16. In a device of the class described, the combination with an engine, the fuel inlet therefor, and means controlling the flow through said inlet to the engine, of means communicating with said inlet and susceptible to changes of conditions therein for operation thereby, centrifugally operating mechanism driven by the engine and coacting with said means, and a device connected to be operated by said co-acting means and mechanism.

17. In a device of the class described, the combination with an engine and the fuel mixture inlet therefor, of centrifugally operated mechanism driven by the engine, and means dependent for its operation upon conditions within the manifold and operatively associated for co-action with said mechanism.

18. In a device of the class described, the combination with an engine and its intake manifold, of an ignition timing device for the engine, a fluid tight flexible diaphragm, operative connections between the same and said timing device, resilient means to resist movement of said diaphragm inclosed within said device, and communicating means between said intake manifold and said diaphragm whereby the diaphragm is susceptible to changes within said manifold to operate said timing device.

19. In a device of the class described, the combination with an internal combustion engine, the intake manifold and ignition and timing mechanisms therefor, of a housing communicating with said manifold, a diaphragm therein capable of movement and susceptible to conditions within said intake manifold, spring mechanism within said housing to resist movement of said diaphragm and adjustable from the exterior of said housing to vary the spring effect, and operative connections between said diaphragm and said ignition and timing mechanisms.

20. In a device of the class described, the combination with an internal combustion engine, the intake manifold and ignition timing mechanism, of a housing, a flexible fluid tight diaphragm therein, a spring in said housing normally resisting movement of said diaphragm and adjustable from the exterior of said housing to vary the resistive effect on said diaphragm, operative connections between said diaphragm and said timing mechanism, and means effecting communication between the interior of said intake manifold and said diaphragm whereby said diaphragm is susceptible to changes within said manifold.

21. In a device of the class described, the combination with the intake manifold of an engine and ignition timing mechanism thereof, of a movable diaphragm fastened securely against movement at its periphery in communication with said manifold to move according to conditions existing and occurring therein, operative mechanisms between said diaphragm and said timing mechanism for operation of the latter according to power requirements imposed upon the engine, means affording communication between said diaphragm and manifold comprising a tubular connection, and a nozzle tube adjustably connected therewith and adjustably connected into the manifold and projecting inwardly thereinto from the walls of the manifold.

22. In a device of the class described, the combination with the intake manifold of an engine and adjustable timing means for the ignition of said engine, of a casing, a flexible diaphragm secured tightly thereon forming one wall thereof, a pipe affording communication between the interior of said casing, resilient means within said casing bearing against said diaphragm, mechanism for adjusting the resilient effect thereof from the exterior of said casing and said intake manifold whereby said diaphragm moves in accordance with conditions within said manifold, and operative connections between said diaphragm and said timing means.

23. In a device of the class described, the combination with the intake manifold of an engine and timing means for the ignition of said engine, of a casing, a fluid tight diaphragm secured thereon affording one wall thereof, means affording communication between the interior of said casing and said diaphragm whereby said diaphragm moves in accordance with conditions within the manifold, said means communicating with and projecting into said manifold beyond the inner walls thereof and adjustable therein so as to be susceptible to various aspirational, static and dynamic conditions of flow and pressure in said manifold, and operative connections between said diaphragm and said timing means to adjust said timing means according to power requirements on the engine.

24. The combination with an engine and its ignition means, of speed controlled mechanism for varying the timing of said means, and a diaphragm connected with the intake manifold of the engine and susceptible to conditions within said manifold also connected to said ignition means to vary the timing thereof according to conditions within the intake manifold of the engine.

25. In a device of the class described, the combination with an engine and its ignition means, of co-acting mechanisms for varying the timing of the ignition means, said mechanisms comprising a device actuatable by changes in speed, and a flexible diaphragm susceptible to conditions within the intake manifold of the engine.

26. In a device of the class described, the combination with an engine and its ignition means, of mechanisms for changing the timing of the ignition means, said mechanisms connected with the intake manifold of the engine, and means forming a part of said mechanisms communicating into the interior of said intake manifold and adjustable therein so as to be susceptible to various static and dynamic conditions and changes of conditions therein.

27. The combination with an engine and its ignition means, of mechanisms comprising in part a flexible diaphragm and an adjustable tube having a beveled mouth projecting into the interior of the manifold and communicating with said diaphragm, adapting said diaphragm to utilize and move according to various dynamic and aspiration effects of flow within said manifold to vary the timing of said ignition means.

28. The combination with an engine and its ignition means, of a diaphragm connected to vary the timing of said ignition means, and mechanism affording communication between said diaphragm and the interior of the intake manifold of the engine, and adjustable within the interior of said manifold to utilize the various dynamic and aspiration effects of flow and conditions of pressure therein, to cause movement of said diaphragm.

29. In a device of the class described, for varying the timing of the ignition on a gasolene engine, means for operating the timing mechanism, and an adjustable connection between said means and the intake manifold of the engine comprising in part a tube projecting into the interior of said manifold whereby said means may be made susceptible for movement by utilizing the various conditions within said intake manifold according to adjustment of said tube.

30. In a device of the class described, the combination with a gasolene engine, its ignition means and intake manifold, of speed controlled devices for varying the timing of said ignition means according to different speeds of the engine, a flexible diaphragm susceptible to variations in pressure and connected to said ignition means and co-acting with speed controlled devices to properly adjust said ignition means, and mechanism adjustably connected within said intake manifold and communicating with said diaphragm to cause operation of the same and said ignition means characteristically according to power requirements on the engine.

31. In a device of the class described, the combination with an engine and its intake manifold, of an ignition timing device for the engine, a speed controlled mechanism for adjusting said ignition timing device for different speeds of the engine, a flexible diaphragm, operative connections between the same and said timing device for co-action with said speed controlled mechanism for properly adjusting said timing device, and communicating means between said intake manifold and said diaphragm whereby the diaphragm is susceptible to changes within said manifold for movement to operate said timing device.

32. In a device of the class described, the combination with an internal combustion engine, the intake manifold and ignition and timing mechanisms therefor, of a speed controlled means for operating said timing mechanisms, a diaphragm capable of movement and connected to said intake manifold and susceptible to conditions within said intake manifold for movement according to said conditions, and operative connections between said diaphragm and said timing mechanisms for coaction with said speed controlled means in properly adjusting said timing mechanisms.

33. In a device of the class described, the combination with an engine and its auxiliary devices, one thereof shiftable for different conditions of operation of the engine, mechanism for shifting the same, said mechanism susceptible to pressure conditions for its operation, and connections between said mechanism and the manifold of said engine to utilize the conditions of pressure and flow within said manifold to cause operation of said mechanism.

34. In a device of the class described, the combination with an engine and an auxiliary device, adjustable to different positions for different conditions of operation of said engine, of a mechanism connected to the intake manifold of the engine and susceptible to conditions therein for movement to operate said device, and means shiftable according to the speed of the engine co-acting with said mechanism in effecting an adjustment of said device for proper operation of the engine under all conditions.

35. The combination with an engine and auxiliary device adjustable to different positions according to different conditions of operation of said engine and driven by said engine and by adjustment controlling the different phases of operation thereof, of means susceptible to conditions within the intake manifold of the engine moving according to a change in said conditions, and a mechanism co-acting with said means and with said means connected to operate said device, said means moving automatically to transmit movement to said device according to changes in speed of the engine.

36. The combination with an engine and an auxiliary device operated thereby and forming a part thereof on which said engine depends for its operation, of a flexible fluid tight diaphragm, a tube communicating therewith and projecting into and susceptible to conditions within a manifold of said engine to adjust said device according to different conditions of operation of the engine.

In testimony whereof I have hereunto subscribed my name in the presence of two subscribing witnesses.

DANIEL ROESCH.

Witnesses:
 LE ROY D. KILEY,
 GEORGE R. MOORE.